United States Patent
Andrews, Sr.

[15] 3,680,971
[45] Aug. 1, 1972

[54] MACHINE AND METHOD FOR ADDING LEFT THREADS TO RIGHT THREADED BOLT

[72] Inventor: Mark B. Andrews, Sr., Box 9, Cape Coral, Fla. 33904

[22] Filed: Sept. 23, 1970

[21] Appl. No.: 74,735

[52] U.S. Cl. ..................408/1, 10/1 B, 10/10 R, 10/27 R, 10/92, 408/36
[51] Int. Cl. .............................B23g 1/02, B23g 5/00
[58] Field of Search .......10/1 R, 1 B, 10 R, 27 R, 89, 10/91, 92, 111; 408/1, 36

[56] References Cited

UNITED STATES PATENTS

| | | | |
|---|---|---|---|
| 403,791 | 5/1889 | Taylor | 10/92 |
| 419,981 | 1/1890 | Watson et al. | 408/36 |
| 976,880 | 11/1910 | Hunter | 10/89 |
| 1,999,816 | 4/1935 | Lindenmuth et al. | 10/1 |

FOREIGN PATENTS OR APPLICATIONS

| | | | |
|---|---|---|---|
| 459,236 | 8/1949 | Canada | 10/1 |

Primary Examiner—Charles W. Lanham
Assistant Examiner—E. M. Combs
Attorney—Rogers, Ezell, Eilers & Robbins

[57] ABSTRACT

Apparatus and method for cutting left-hand threads on a right-hand bolt and removing burrs resulting from such cutting. A right-hand thread cutting die is mounted backward to rotate coaxially with a left-hand-thread cutting die. On insertion into this die assembly, the bolt first passed through the backward mounted right-hand-thread cutting die teeth of which merely follow the right-hand threads on the bolt. Then the bolt passes through the left-hand-thread cutting die the teeth of which cut left-hand threads on the bolt and also form burrs on the right-hand threads of the bolt. On withdrawal of the bolt from the die assembly, the directions of rotation of the dies are reversed. The backward mounted right-hand-thread cutting die cuts the burrs from the right-hand threads while the left-hand thread cutting die now follows the path of the left-hand threads it previously cut in the bolt.

6 Claims, 5 Drawing Figures

PATENTED AUG 1 1972 3,680,971
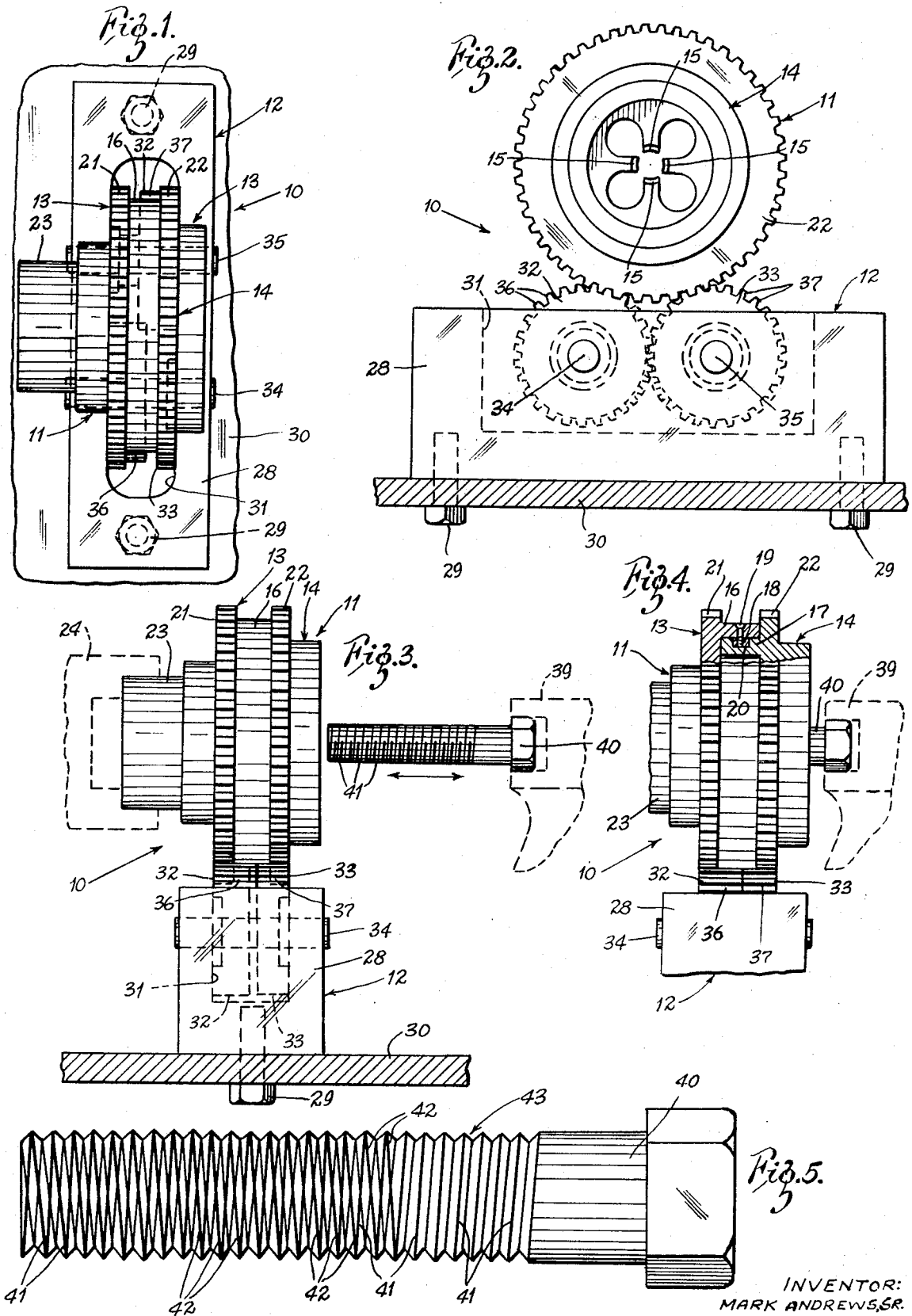
INVENTOR:
MARK ANDREWS, SR.
BY Rogers, Ezell, Eilers + Robbins
ATTORNEYS

MACHINE AND METHOD FOR ADDING LEFT THREADS TO RIGHT THREADED BOLT

BRIEF DESCRIPTION OF THE INVENTION

A bolt that has both left-hand and right-hand threads has certain advantages. In particular, since the bolt can receive a left-hand threaded nut behind a right-hand threaded nut, a positive lock can be achieved. Furthermore, any vibration of the thing held by the bolt and nuts further tightens the nuts, increasing the strength of the lock.

However, there have been problems in bolts having both right-hand and left-hand threads. When the left-hand threads are cut on a right-hand threaded bolt, the left-hand-thread cutting die has left burrs where its cutting edges leave the right-hand threads. Also, the addition of the left-hand threads weakens the right-hand threads. This invention solves both of these principal problems.

In this apparatus, a die assembly is designed for mounting in the rotatable headstock chuck of a lathe with the bolt to be threaded mounted in the axially movable tailstock chuck of the lathe. A gear box is mounted to a suitable part of the frame of the lathe. The die assembly comprises a left-hand-thread cutting die and a right-hand-thread cutting die mounted coaxially and oriented so that the right-hand-thread cutting die is toward the bolt relative to the left-hand-thread cutting die. When the headstock chuck rotates the left-hand-thread cutting die in one direction, the gear train that includes the gears in the gear box causes the right-hand-thread cutting die to rotate in the opposite direction. The left-hand-thread cutting die is mounted forward such that it is oriented to cut threads as a bolt moves forwardly through it and the right-hand-thread cutting die is mounted backward such that it is oriented to cut threads as a bolt that has been inserted through it is withdrawn. As the bolt is inserted into the die assembly, the cutting teeth of the right-hand-thread cutting die merely follow the right-hand threads of the bolt as the cutting teeth of the left-hand-thread cutting die cut left-hand threads in the bolt and in so doing form burrs on the right-hand threads. As the bolt is withdrawn from the die assembly while the dies are rotated in the opposite direction, the teeth of the left-hand-thread cutting die follow the left-hand threads while the teeth of the right-hand-thread cutting die cut the burrs from the right-hand threads.

BRIEF DESCRIPTION OF THE DRAWING

FIG. 1 is a top plan view of the threading die assembly and gear box with the gear box shown mounted to the frame of a lathe, the latter being illustrated fragmentarily;

FIG. 2 is a front elevation view of the threading die assembly and gear box as viewed from the right side of FIG. 1;

FIG. 3 is a left side elevation view of the die assembly and gear box as viewed from the left side of FIG. 2, with the headstock chuck and the tailstock chuck of a lathe shown in dotted lines and with a bolt held by the tailstock chuck shown prior to entry into the die assembly;

FIG. 4 is a fragmentary side view similar to that of FIG. 3, but with parts shown in section and with the bolt shown inserted in the die assembly;

FIG. 5 is an enlarged side elevation view of a bolt with threads formed by the apparatus of this invention.

DETAILED DESCRIPTION OF THE INVENTION

The apparatus 10 for cutting left-hand threads on a right-hand threaded bolt comprises a die assembly 11 and a gear box 12. The die assembly 11 comprises a conventional left-hand-thread cutting die 13 and a conventional right-hand-thread cutting die 14, each of which has cutting teeth 15 as illustrated in FIG. 2 for cutting threads on a bolt. The left-hand-thread cutting die 13 and the right-hand-thread cutting die 14 are mounted together by any suitable means that will permit them to rotate freely relative to one another on a common axis. For example, the left-hand-thread cutting die 13 may have an outer sleeve 16 that rotates about a sleeve 17 on the right-hand-thread cutting die, with a split ring 18 fastened to the sleeve 16 by screws 19 and rotatable within a circumferential groove 20 in the sleeve 17.

The left-hand-thread cutting die 13 has an external spur gear 21 formed as part of its external housing, and the right-hand-thread cutting die has an external spur gear 22 formed as part of its outer housing. The gears 21 and 22 are of the same pitch and have the same number of teeth. A rearwardly projecting hub 23 on the left-hand-thread cutting die 13 rotates that die to be held in the headstock chuck 24 of a conventional lathe.

The cutting dies 11 and 12 are connected together in such a way that the right-hand-thread cutting die 14 is mounted backwards and the left-hand-thread cutting die 13 is mounted forward. In other words, when the left-hand-thread cutting die 13 is rotating in a clockwise direction as viewed in FIG. 2 and a bolt is moved in a forward direction (toward the left as viewed in FIG. 3) through the cutting teeth of the left-hand-thread cutting die 13, the left-hand-thread cutting die 13 will cut left-hand threads on the bolt stock. However, since the right-hand-thread cutting die 14 is mounted backward, its cutting teeth will cut right-hand threads on the bolt only as the bolt is withdrawn from within the die assembly 11 past the cutting teeth of the right-hand-thread cutting die 14 as the die 14 rotates in a clockwise direction (as viewed in FIG. 2).

The gear box 12 comprises a housing 28 that is fastened by bolts 29 to a portion of the frame 30 (shown schematically) of the lathe. The housing 28 has a well 31. Two spur gears 32 and 33 are positioned within the well with shafts 34 and 35, respectively, rotatably journalled within the sides of the housing 28. The teeth 36 of the gear 32 are in mesh with the teeth 37 of the gear 33. The gears 32 and 33 have the same number of teeth and their pitch is the same as the pitch of the gears 21 and 22. The teeth 36 of the gear 32 are in mesh with the teeth 37 of the gear 33. Also, the teeth 36 of the gear 32 are in mesh with the teeth of the gear 21 and the teeth 37 of the gear 33 are in mesh with the teeth of the gear 22.

Thus, when the headstock chuck 24 is rotated (by a conventional lathe motor, not shown) in, say, a clockwise direction, it rotates the gear 21 in a clockwise direction. Rotation of the gear 21 rotates the gear 32 in a counter-clockwise direction. Rotation of the gear 32 in a counter-clockwise direction causes the gear 33 to rotate in a clockwise direction. Rotation of the gear 33 in a clockwise direction causes the gear 22 to rotate in a counter-clockwise direction. Accordingly, the gear box 12 provides a drive to cause the left-hand-thread cutting die 13 to rotate in a direction opposite to the direction of rotation of the right-hand-thread cutting die 14.

Finally, the conventional lathe has a tailstock chuck 39 (shown schematically) for holding a bolt 40 that has conventional right hand threads 41 on it. The tailstock chuck 39, as on a conventional lathe, is mounted to slide axially toward and away from the die assembly 11 to move the bolt into and away from the die assembly 11 as illustrated in FIGS. 3 and 4 to form left-hand threads 42 on the bolt while leaving a section 43 toward the head of the bolt that has only right-hand threads.

A bolt 40 having right-hand threads 41 is mounted in the tailstock chuck 39 of a lathe. The die assembly 11 is held within the rotatable headstock chuck 24 of the lathe, and the gear box 12 is mounted on the lathe frame 30 with its gears 32 and 33 meshed with the gears 21 and 22 of the die assembly 11. The bolt 40 is to be threaded with left-hand threads and the burrs created by such left-hand threading are to be removed.

Insertion of the bolt 40 into the die assembly 11 cuts left-hand threads on the bolt. This is followed by withdrawal of the bolt during which burrs produced on the right-hand threads by the cutting of the left-hand threads are removed. Insertion of the bolt 40 is done by moving the tailstock chuck 39 toward the die assembly 11 with the right-hand-thread cutting die 14 being rotated in a clockwise direction and the left-hand-thread cutting die 13 being rotated in a counter-clockwise direction, as viewed in FIG. 2. These directions of rotation are achieved by the drive transmitted by the headstock chuck 24 to rotate the left-hand-thread cutting die 13 in a counterclockwise direction. The gears 32 and 33 complete the drive train between the dies 13 and 14 to rotate the right-hand-thread cutting die 14 in a clockwise direction.

Since the right-hand-thread cutting die 14 is mounted backward, as the bolt enters the cutting teeth of the right-hand-thread cutting die 13, it's cutting teeth merely trace the path of the right-hand threads 41. As the bolt 40 moves within the rotating cutting teeth of the left-hand-thread cutting die 13, left-hand threads 42 are cut on the bolt 40. As these left-hand threads are cut, they form interfering burrs on the right-hand threads 41 that were already on the bolt 40. As the bolt 40 continues to pass through the left-hand-thread cutting die 13 from right to left as viewed in FIG. 3, the die 13 cuts the left-hand threads 42 as illustrated in FIG. 5.

When the bolt 40 has been fully inserted and the left-hand threads 42 cut over the desired length of the shank of the bolt, as illustrated in FIG. 5, the direction of rotation of the headstock chuck 24 is reversed and the tailstock chuck 39 is moved to the right as viewed in FIG. 3 to withdraw the bolt 40. Since, during withdrawal of the bolt 40, the left-hand-thread cutting die 13 is now rotating in a clockwise direction as viewed in FIG. 2, its cutting teeth merely track the path of the left-hand threads they previously cut in the bolt 40. Now, however, since the backward mounted right-hand-thread cutting die 14 is rotating in a counter-clockwise direction as viewed in FIG. 2, its cutting teeth cut through the path of the right-hand threads 41 on the bolt, cutting the burrs from those threads that were formed during the cutting of the left-hand threads. Therefor, when the bolt 40 is finally removed from the die assembly 11, the bolt has right and left-hand threads 41 and 42 free of burrs.

Even though the finished bolt 40 necessarily has a section 43 having only right-hand threads originally formed on it because of the thickness of the right-hand-thread cutting die 14, the bolt 40 will receive both left and right-hand threaded nuts. Since the right-hand threaded nut goes on the bolt 40 first, it can be threaded onto the section 43 with the left-hand threaded locking nut to follow. Since the right-hand threaded nut is on the section 43 having only right-hand threads, it is on the strongest part of the bolt unweakened by the addition of the left-hand threads. The presence of the right-hand-thread cutting die 14 assures that a section 43 having only right-hand threads will remain. Hence, the strength of the bolt is not diminished. The locking left-hand threaded nut is threaded onto the left-hand threads 42.

Various changes and modifications may be made within this invention as will be readily apparent to those skilled in the art. Such changes and modifications are within the scope and teaching of this invention as defined by the claims appended hereto.

What is claimed is:

1. Apparatus for cutting second threads on a bolt having first threads pitched opposite to said second threads and for removing the burrs caused by cutting the second threads comprising a die assembly including a first thread cutting die of a type for cutting threads of the first type, a second thread cutting die for cutting said second threads, means for mounting the cutting dies for relative coaxial rotation, the first thread cutting die being mounted backward so that its cutting teeth are oriented to track in the first threads upon insertion of the bolt into the dies and cut threads upon withdrawal of the bolt from the dies, the second thread cutting die being mounted forward so that its cutting teeth are oriented to cut threads upon insertion of the bolt into the dies and track in the second threads upon withdrawal of the bolt from the dies, means to rotate the dies in opposite directions such that said second die rotates in a cutting direction upon insertion of the bolt into the dies, and said first die rotates in a cutting direction upon withdrawal of the bolt from the dies, whereby said second die cuts said second threads and said first die tracks said first threads upon insertion of the bolt into the dies, and said second die tracks said second threads and said first die cuts the burrs from said first threads upon withdrawal of the bolt from the dies.

2. The apparatus of claim 1 wherein the first thread cutting die is mounted between the bolt and the second thread cutting die.

3. The apparatus of claim 1 including means adapting the die assembly for mounting in the rotatable chuck of a lathe for cutting threads and removing burrs on a bolt mounted in the axially slideable chuck of a lathe.

4. The apparatus of claim 1 including an external spur gear affixed to each die, a pair of transmission gears meshed with one another, one transmission gear being in mesh with the spur gear affixed to one die, the other transmission gear being in mesh with the spur gear affixed to the other die.

5. A method for forming second threads on a bolt having first threads pitched opposite to said second threads comprising the steps of passing the bolt through the cutting teeth of a rotating backward-mounted first thread cutting die of a type for cutting said first threads so that the cutting teeth thereof can track in said first threads of the bolt upon insertion of the bolt into the die, introducing the bolt into a forward-mounted second thread cutting die of a type for cutting said second threads prior to withdrawal of the bolt from the first thread cutting die so that upon rotation of the second thread cutting die in a cutting direction said second threads are cut in the bolt by the cutting teeth of said second thread cutting die, thereafter reversing the directions of rotation of the first and second thread cutting dies while withdrawing the bolt from the two dies so that the cutting teeth of the second thread cutting die track the second threads while the cutting teeth of the first thread cutting die cut the burrs from the first threads of the bolt.

6. The method of claim 5 wherein the cutting dies are coaxially mounted.

* * * * *